(12) United States Patent
Kasralikar et al.

(10) Patent No.: US 7,773,507 B1
(45) Date of Patent: Aug. 10, 2010

(54) AUTOMATIC TIERED SERVICES BASED ON NETWORK CONDITIONS

(75) Inventors: Rahul Kasralikar, San Jose, CA (US); Jeffrey Fowler, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 612 days.

(21) Appl. No.: 11/479,177

(22) Filed: Jun. 30, 2006

(51) Int. Cl.
*H04L 12/26* (2006.01)

(52) U.S. Cl. .................................. 370/230; 726/13

(58) Field of Classification Search ........................ None
See application file for complete search history.

(56) References Cited

U.S. PATENT DOCUMENTS

| | | | |
|---|---|---|---|
| 6,272,598 B1 | 8/2001 | Arlitt et al. | |
| 6,909,724 B1 | 6/2005 | Albert et al. | |
| 6,954,739 B1* | 10/2005 | Bouillet et al. | 705/63 |
| 7,317,693 B1 | 1/2008 | Roesch et al. | |
| 7,349,332 B1 | 3/2008 | Srinivasan et al. | |
| 7,369,557 B1 | 5/2008 | Sinha | |
| 7,389,537 B1* | 6/2008 | Callon et al. | 726/22 |
| 7,394,756 B1* | 7/2008 | Cook | 370/216 |
| 7,408,932 B2* | 8/2008 | Kounavis et al. | 370/392 |
| 7,464,407 B2* | 12/2008 | Nakae et al. | 726/22 |
| 7,478,156 B1 | 1/2009 | Pereira | |
| 7,489,640 B2 | 2/2009 | Corley | |
| 2002/0083175 A1* | 6/2002 | Afek et al. | 709/225 |
| 2003/0204621 A1 | 10/2003 | Poletto et al. | |
| 2005/0213570 A1 | 9/2005 | Stacy et al. | |
| 2006/0146708 A1 | 7/2006 | Kanazawa | |
| 2006/0187836 A1 | 8/2006 | Frey et al. | |
| 2006/0212572 A1* | 9/2006 | Afek et al. | 709/225 |
| 2007/0204117 A1 | 8/2007 | Van Riel et al. | |
| 2007/0268829 A1* | 11/2007 | Corwin et al. | 370/235 |

OTHER PUBLICATIONS

Final Office Action for U.S. Appl. No. 11/479,176 Mailed Sep. 18, 2009, 24 pages.
Non-Final Office Action for U.S. Appl. No. 11/479,176 Mailed Jan. 22, 2010, 29 Pages.

* cited by examiner

*Primary Examiner*—Steven H Nguyen
*Assistant Examiner*—Alex Skripnikov
(74) *Attorney, Agent, or Firm*—Blakely, Sokoloff, Taylor & Zafman LLP

(57) ABSTRACT

A traffic selector table for a network switch is populated with one or more entries that each identifies a tiered service. A traffic flow that matches an entry in the table is identified by the switch. The matched traffic flow is redirected to an intrusion prevention device to determine whether the traffic presents a threat to the network. The switch detects a condition in network traffic flowing through the switch. The traffic selector table is dynamically modified in response to the detected condition.

11 Claims, 3 Drawing Sheets

US 7,773,507 B1

AUTOMATIC TIERED SERVICES BASED ON NETWORK CONDITIONS

FIELD

Embodiments of the invention relate to packet flows in a network switch, and particularly to automating the redirection of packet flows based on network conditions.

BACKGROUND

A network flow, also referred to herein as simply a "flow," is a sequence of network packets sharing certain characteristics. A common set of characteristics used to define a flow is referred to as a "5-tuple." A 5-tuple is a sequence of packets sharing the same source and destination address, source and destination port, and protocol (5 values total, hence the "5-tuple" label.) Other combinations of flow characteristics may also be used in defining a network flow.

A "tiered service" (also referred to herein as a "network service" or, simply, a "service") is a term used to indicate a type of network traffic (e.g., mail traffic, web traffic, Structured Query Language (SQL) traffic, etc.). Typically, these different types of traffic, or services, communicate using standard port numbers. For example, the standard port number for Simple Mail Transfer Protocol (SMTP) traffic is port 25, using Transmission Control Protocol (TCP) or User Datagram Protocol (UDP). As another example, the standard TCP/UDP port number for File Transfer Protocol (FTP) traffic is port 21. In addition to using a port number, services can be identified based on other characteristics other such as source or destination address, protocol or combinations of port numbers, source and destination addresses, and/or protocol.

Network switches and/or other network devices can filter, redirect, block, and/or forward network traffic based on the traffic's type of service. For example, a switch may be configured to redirect a particular type of traffic, such as mail traffic, to an external device for inspection. In the context of network switching, tiered services are often implemented statically using fixed user configurations. As used herein, "implementing a service" refers to adding or deleting a service in a table/list of services that is referenced to determine whether to take an action (e.g., blocking, forwarding, redirecting, etc.) on packets flowing through a switch or network device. Static/manual implementation of services does not take into account changing network conditions. When network conditions change, an administrator may want to add or delete a service in response to the changed conditions. Manual addition/deletion of services can be burdensome to an administrator and contributes to delays in reacting to the changing network conditions.

SUMMARY

A traffic selector table for a network switch is populated with one or more entries that each identifies a tiered service (e.g., email, web, SQL, etc.). The switch identifies traffic flows that match an entry in the table. Matched traffic flows are redirected to an intrusion prevention system (IPS) device to determine whether the traffic presents a threat to the network. When the switch detects a condition in the traffic flowing through the switch, the traffic selector table is dynamically modified to account/compensate for the detected condition. For example, if the switch detects a surge in email traffic, the traffic selector table can be dynamically modified to include an entry for email traffic, which will cause future email traffic to be redirected for further packet inspection.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

A network switch operates in conjunction with an external intrusion prevention system (IPS) to provide network security (e.g., threat detection and/or mitigation). The switch redirects traffic to the IPS for further inspection, sometimes referred to as "deep packet inspection." Most external IPS devices do not have the bandwidth capabilities to inspect all traffic flowing through the switch in real-time without significantly throttling or bottlenecking the traffic. Thus, switches typically redirect only a portion of the overall traffic to an IPS device based on the bandwidth of the device.

The IPS device analyzes the redirected traffic to determine whether a particular flow is good (e.g., safe, not a threat, etc.) or bad (e.g., viruses, worms, denial of service (DoS) attacks, etc.). These determinations are communicated back to the switch to provide a basis for future redirection decisions. For example, an IPS device might determine that a particular flow (e.g., flow B) is a good flow. The IPS sends a notification to the switch identifying flow B as a good flow. The switch stores a flow identifier (e.g., a 5-tuple) for flow B in a memory. Thus, once a flow identifier for flow B is stored in the memory, any subsequently received packets associated with flow B will generate a match with the flow B identifier in memory, causing the switch to forward the flow B packets directly through the switch without redirecting them to the IPS device. This decision to forward packets directly through the switch is referred to herein as a "post-analysis" action because flow B has previously been analyzed by the IPS device and has been determined to be safe for the network.

As referred to herein, a "pre-analysis" action is an action on a flow that has not been previously analyzed by the IPS device. For example, if packets associated with a flow, C, enter the switch and do not match a flow identifier stored in memory, the flow C packets are redirected to a traffic selector. Based on the network conditions, the traffic selector takes a pre-analysis action on flow C (e.g., redirecting the flow C traffic to the IPS device). In one embodiment, detection of an abnormal spike in traffic associated with a particular service (e.g., email, web, etc.) causes the detected service to be added to a table/list of services that require further inspection by the IPS device. In another embodiment, detection of traffic congestion between the traffic selector and the IPS device triggers the traffic selector to remove a service from the table/list of services in order to reduce congestion in the traffic flowing to the IPS device. In yet another embodiment, an external device may want to examine traffic associated with a particular service or flow. Thus, the external device can communicate with the traffic selector to add the desired flow or service to the table/list.

Figure 1:
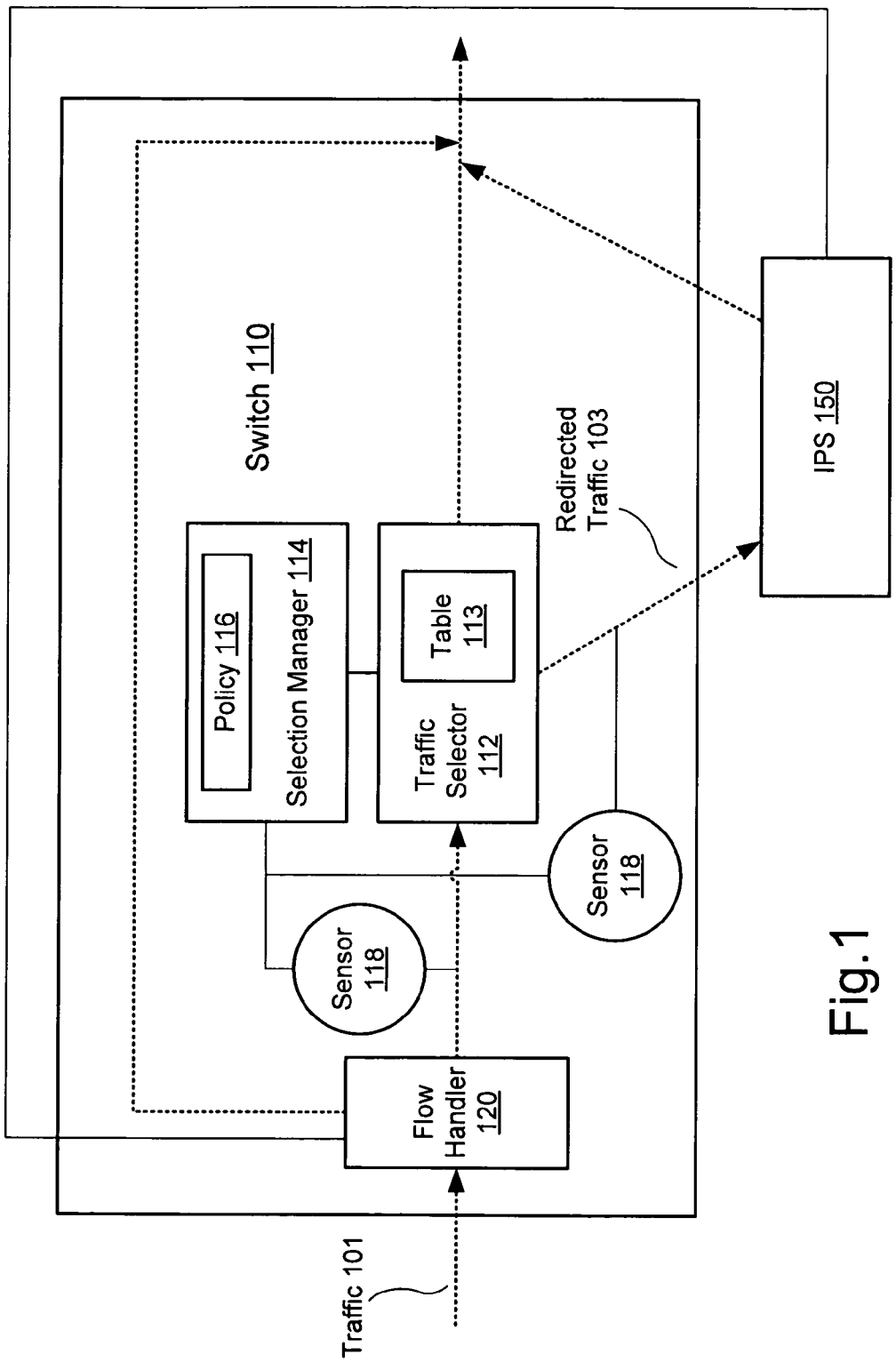
FIG. 1 is a block diagram of an embodiment of the invention having a traffic selector.

FIG. 1 illustrates an embodiment of the invention having a traffic selector. Switch 110 receives traffic 101 (i.e., packet traffic/flows). Flow handler 120 identifies flows that have previously been analyzed and determined by the intrusion prevention system (IPS) 150 to be safe for the network. These flows are forwarded directly through switch 110 without further interruption. The remaining traffic is sent to traffic selector 112.

Traffic selector 112 identifies flows for redirection to IPS 150 on a per flow basis or a per-service (e.g., email, web, SQL, FTP, etc.) basis. Traffic selector 112 includes a table, 113, having entries that identify flows and/or services that have been flagged for further packet inspection (discussed in detail below). In other words, traffic associated with a service that matches an entry in table 113 is redirected to IPS 150. Table 113 is implemented in a cache or memory (e.g., random access memory (RAM), read-only memory (ROM), flash memory, etc.). In one embodiment, table 113 is implemented in a content addressable memory (CAM). In another embodiment, a ternary CAM, or TCAM, is used to implement the table.

IPS 150 analyzes redirected traffic 103 to determine whether a particular flow is good (e.g., safe, not a threat, etc.) or bad (e.g., viruses, worms, denial of service (DoS) attacks, etc.). These determinations are communicated back to flow handler 120 to provide a basis for future post-analysis forwarding decisions. For example, an IPS device might determine that a particular flow (e.g., flow B) is a good flow. The IPS sends a notification to flow handler 120 identifying flow B as a good flow. The switch stores a flow identifier (e.g., a 5-tuple) for flow B in a memory. Thus, once a flow identifier for flow B is stored in the memory, any subsequently received packets associated with flow B will generate a match with the flow B identifier in memory, causing the switch to forward the flow B packets through the switch without passing them through traffic selector 112 or redirecting them to IPS 150.

For flows/traffic/packets that are passed from flow handler 120 to traffic selector 112, table 113 identifies services and/or flows that have been flagged for vulnerability inspection. The entries in table 113 are dynamically/automatically updated based on current network conditions. Network conditions are detected by sensors 118. In one embodiment, switch 110 includes a first sensor to monitor traffic passed from flow handler 120 to traffic selector 112 and a second sensor to monitor traffic between traffic selector 112 and IPS 150. In other embodiments, switch 110 can include any combination of one or more sensors at various locations within the switch to monitor traffic and detect conditions.

Sensors 118 collect various packet statistics such as cumulative packet counts for one or more flows, a change or delta in a packet count over a time interval, a ratio of two cumulative packet counts, and/or a ratio of a change or delta in two different packet counts over a time interval. Given that services (e.g., email, SQL, FTP, etc.) typically communicate using a standard port number, sensors can also track packet counts, deltas, and ratios based on service type.

Sensors 118 may also collect statistics for reverse/outbound traffic associated with a flow. For example, in one embodiment, the sensors track the number of incoming Transmission Control Protocol (TCP) synchronize (SYN) packets received for a particular flow. Meanwhile, the sensors can also track the number of outbound TCP SYN-acknowledge (SYN-ACK) packets associated with the flow.

Sensors 118 report detected conditions to a selection manager 114. Selection manager 114 includes a policy 116. Detected conditions (e.g., a spike in traffic, traffic congestion, etc.) are analyzed using the rules and/or thresholds of policy 116 to determine whether a service or flow associated with a detected condition warrants further inspection by IPS 150. In one embodiment, sensors 118 may detect an abnormal increase in email traffic entering switch 110. If the abnormality triggers a rule or exceeds a threshold of policy 116, then selection manager 114 will automatically update table 113 to include email traffic. Thus, any subsequent email traffic received by traffic selector 112 is redirected to IPS 150 for vulnerability detection.

In another embodiment, sensors 118 may detect congestion in redirected traffic 103 due to the limited bandwidth of IPS 150. In this case, selection manager 114 automatically modifies table 113 by removing one or more services as needed to reduce the redirected traffic 103 flowing to IPS 150.

As discussed above, selection manager 114 dynamically modifies table 113 based on policy 116. It should be noted that while policy 116 dictates the dynamic modifications made by selection manager 114, the policy itself may also be modified. From time to time, the demands/needs/objectives of a network and/or network device may change. When these changes occur, a network administrator can access policy 116 to make modifications that better suit the changing needs of the network.

Figure 2:
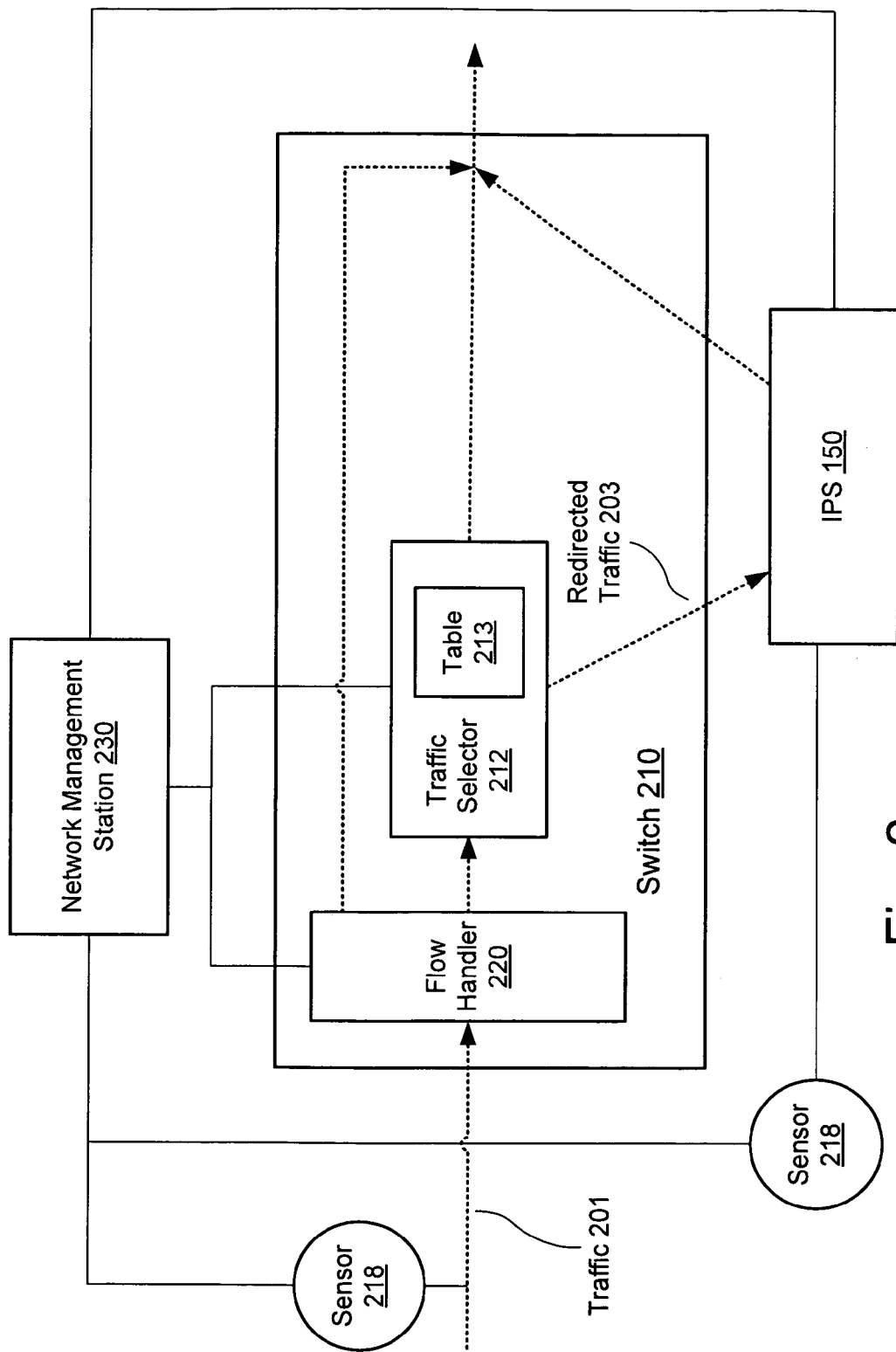
FIG. 2 is a block diagram of another embodiment of the invention having a traffic selector.

FIG. 2 illustrates another embodiment of the invention having a traffic selector. (It should be noted that the invention is not limited to embodiments having a single traffic selector; multiple traffic selectors may also be included in an embodiment of the invention.)

Switch 210 receives traffic 201 (i.e., packet traffic/flows). Flow handler 220 identifies flows that have previously been analyzed and determined to be safe and/or good by the intrusion prevention system (IPS) 150. These flows are forwarded directly through switch 210 without further interruption. The remaining traffic is sent to traffic selector 212.

Traffic selector 212 identifies flows for redirection to IPS 150 based on a flow's service type (e.g., email, web, SQL, FTP, etc.). Traffic selector 212 includes a table 213 having entries that identify services that have been flagged for further packet inspection. Table 213 is implemented in a cache or memory (e.g., random access memory (RAM), read-only memory (ROM), flash memory, etc.).

IPS 150 analyzes redirected traffic 203 to determine whether a particular flow is good (e.g., safe, not a threat, etc.) or bad (e.g., viruses, worms, denial of service (DoS) attacks, etc.). These determinations are communicated back to a network management station 230. Network management station 230 communicates the information to flow handler 220 to provide a basis for future post-analysis forwarding decisions.

For flows/traffic/packets that are passed from flow handler 220 to traffic selector 212, table 213 identifies services and/or flows that have been flagged for vulnerability inspection. The entries in table 213 are dynamically/automatically updated based on current network conditions. Network conditions are detected by sensors 218. In one embodiment, sensors 218 are external to switch 210. In other embodiments, sensors 218 can be internal to switch 210 or a combination of external and internal to switch 210. Sensors 218 monitor traffic 201 flowing into switch 210 along with redirected traffic 203 flowing to IPS 150. Sensors 218 can also monitor traffic at other points in the network or within the network switch 210.

Sensors 218 detect conditions based on various packet statistics, such as cumulative packet counts for one or more flows, a change or delta in a packet count over a time interval, a ratio of two cumulative packet counts, and/or a ratio of a change or delta in two different packet counts over a time interval. Given that services (e.g., email, SQL, FTP, etc.) typically function using a standard port number, sensors can also track packet counts, deltas, and ratios based on service type. Sensors 218 may also collect statistics for reverse/outbound traffic associated with a flow (e.g. TCP SYN-ACK packets, etc.).

Sensors 218 report detected conditions to network management station 230. Network management station 230 includes policies, rules, and/or thresholds for determining how to handle both post-analysis and pre-analysis traffic and/or traffic conditions. With respect to traffic selector 212, detected conditions (e.g., a spike in traffic, traffic congestion, etc.) are analyzed by network management station 230 to determine whether a service or flow associated with a detected condition warrants further inspection by IPS 150. In one embodiment, sensors 218 may detect an abnormal increase in email traffic entering switch 210. If the abnormality triggers a rule or exceeds a threshold, network management station 230 will automatically update table 213 to include email traffic. Thus, email traffic subsequently received by traffic selector 212 will be redirected to IPS 150 for vulnerability detection. In another embodiment, sensors 218 may detect congestion in the redirected traffic 103 due to the limited bandwidth of IPS 150. Thus, network management station will automatically modify table 213 by removing one or more services as needed to reduce the redirected traffic 203 flowing to IPS 150.

As discussed above, table 213 is dynamically modified by network management station 230. Network management station 230 is accessible by an administrator who can modify policies, change rules, and/or adjust thresholds.

Figure 3:
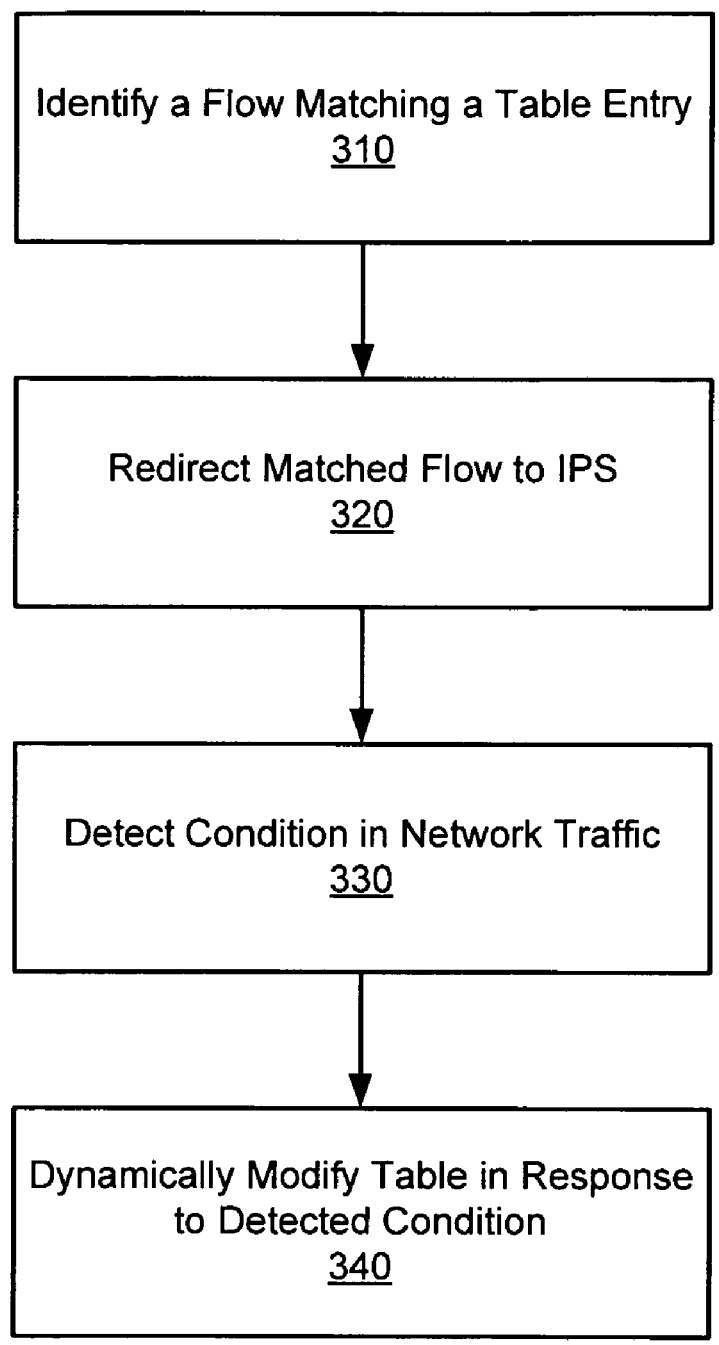
FIG. 3 is a flow diagram of an embodiment of the invention.

FIG. 3 is a flow diagram illustrating an embodiment of the invention. A network switch (or other network device) identifies a flow that matches an entry in a traffic selector table 310. Entries in the table identify services and/or flows that need further inspection by one or more external intrusion prevention system (IPS) devices. A flow is identified by a characteristic or set of characteristics (e.g., source and destination addresses, source and destination ports, IP protocol, etc.) Given that most services (e.g., SMTP, SQL, FTP, etc.) communicate on a standard port, services can be identified based on a port number. Alternatively, a service identifier can be included in a packet header to identify the service type for the packet. Service identifiers are discussed in detail in Request for Comments 3639 (RFC 3639, M. St. Johns, G. Huston, IAB, 2003).

Flows or services that match an entry in the traffic selector table are redirected to one or more external IPS devices for deep packet inspection and/or vulnerability detection 320. An IPS device inspects packets for viruses, worms, denial of service (DoS) attacks, and/or other network threats. If no threat is found in a particular flow, the IPS device notifies the switch or other network device that the flow is safe. If a network threat is detected by the IPS device, the IPS device can block, throttle, or otherwise prevent the flow from reaching the network.

Sensors monitor and detect traffic conditions 330 based on packet statistics. Packet statistics include, but are not limited to, cumulative packet counts for one or more flows, a change or delta in a packet count over a time interval, a ratio of two cumulative packet counts, and/or a ratio of a change or delta in two different packet counts over a time interval. The packet statistics are compared against a policy that determines, for example, whether a detected condition should trigger further packet inspection by the IPS device. If a trigger is warranted by the detected condition, the traffic selector table is dynamically modified 340.

Modifying the traffic selector table can involve adding, deleting, and/or prioritizing entries in the table. For example, if an abnormal spike in traffic for a particular service or flow is detected, then an entry is automatically added to the table to cause service/flow traffic to be redirected to the IPS device for further inspection. In another example, if congestion between a switch and an IPS device is detected, one or more entries may be removed (based on priority) from the table to reduce the amount of traffic being redirected to the IPS device.

Embodiments of the invention described above may include hardware, software, and/or a combination of these. In a case where an embodiment includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc. The machine accessible medium may further include an electronic device having code loaded on a storage that may be executed when the electronic device is in operation. Thus, delivering an electronic device with such code may be understood as providing the article of manufacture with such content described above.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. The above descriptions of certain details and implementations, including the description of the figures, may depict some or all of the embodiments described above, as well as discussing other potential embodiments or implementations of the inventive concepts presented herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. In a network switch, a method comprising:
   redirecting traffic received at the network switch to an external device to perform packet inspection based on a service type associated with the network traffic and based further on entries in a table stored on a memory of the network switch;
   maintaining packet flow statistics for traffic flowing through the network switch;
   dynamically modifying the table of entries based on the packet flow statistics;
   monitoring the redirected traffic for congestion between the network switch and the external device to perform packet inspection; and
   dynamically removing one or more entries from the table when a congestion condition is detected,
   wherein dynamically modifying the table of entries based on the packet flow statistics comprises:
   comparing the packet flow statistics against a policy threshold; and dynamically modifying the table of entries when the policy threshold is exceeded.

2. The method of claim 1, wherein the service type associated with the network traffic is selected from a group including an email service, a web service, a Structured Query Language (SQL) service and a File Transfer Protocol (FTP) service.

3. The method of claim 1, wherein dynamically modifying the table of entries comprises at least one of adding and entry to the table and deleting an entry from the table.

4. The method of claim 1, wherein dynamically modifying the table of entries comprises prioritizing entries in the table.

5. A network switch, comprising:
a traffic selector to redirect traffic received at the network switch to an external device to perform packet inspection based on a service type associated with the network traffic and based further on entries in a table stored on a memory of the network switch;
a traffic sensor to maintain packet flow statistics for traffic flowing through the network switch;
a selection manager coupled to the traffic selector and the traffic sensor to dynamically modify the table of entries based on the packet flow statistics;
a congestion sensor to monitor the redirected traffic for congestion between the network switch and the external device to perform packet inspection; and
the selection manager further to remove one or more entries from the table when a congestion condition is detected,
wherein the selection manager further comprises:
means for comparing the packet flow statistics against a policy threshold; and
means for dynamically modifying the table of entries when the policy threshold is exceeded.

6. The network switch of claim 5, further comprising:
a flow handler to maintain a second table of entries corresponding to one or more tiered services that have been inspected by the external device;
the flow handler to forward packets that match an entry in the second table out of the switch.

7. The network switch of claim 5, wherein the service type associated with the network traffic is selected from a group including an email service, a web service, a Structured Query Language (SQL) service and a File Transfer Protocol (FTP) service.

8. A machine-accessible non-transitory storage medium having instructions stored thereon that, when executed by a network switch, cause the network switch to perform a method comprising:
redirecting traffic received at the network switch to an external device to perform packet inspection based on a service type associated with the network traffic and based further on entries in a table stored on a memory of the network switch;
maintaining packet flow statistics for traffic flowing through the network switch;
dynamically modifying the table of entries based on the packet flow statistics;
monitoring the redirected traffic for congestion between the network switch and the external device to perform packet inspection; and
dynamically removing one or more entries from the table when a congestion condition is detected,
wherein dynamically modifying the table of entries comprises: comparing the packet flow statistics against a policy threshold; and
dynamically modifying the table of entries when the policy threshold is exceeded.

9. The machine-accessible non-transitory storage medium of claim 8, wherein the service type associated with the network traffic is selected from a group including an email service, a web service, a Structured Query Language (SQL) service, and a File Transfer Protocol (FTP) service.

10. The machine-accessible non-transitory storage medium of claim 8, wherein modifying of the table of entries comprises adding or deleting an entry from the table.

11. The machine-accessible non-transitory storage medium of claim 8, wherein dynamically modifying the table of entries comprises prioritizing entries in the table.

\* \* \* \* \*